Dec. 17, 1940.　　　B. H. URSCHEL　　　2,225,139
MOWER
Filed July 21, 1938　　　4 Sheets-Sheet 3

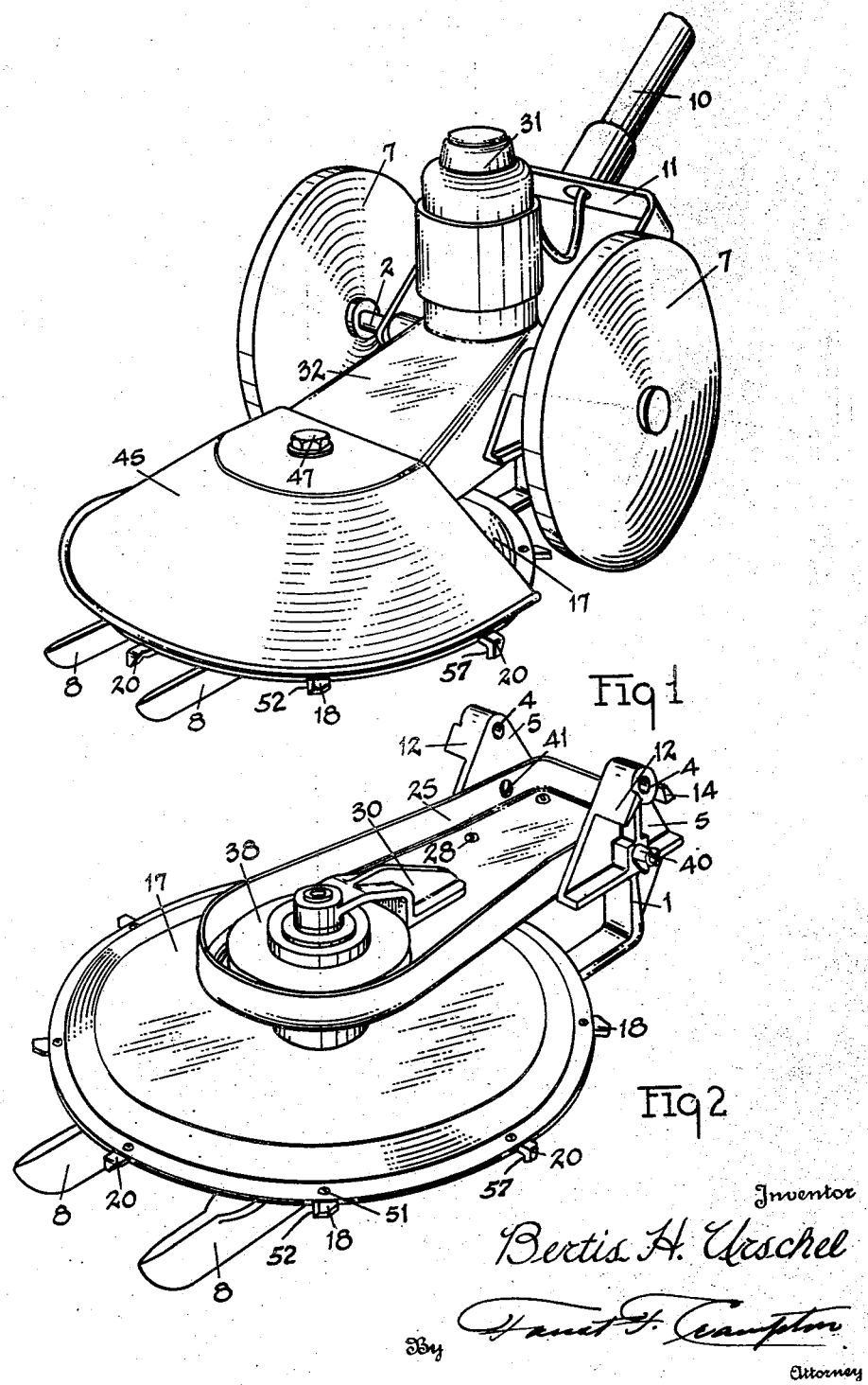

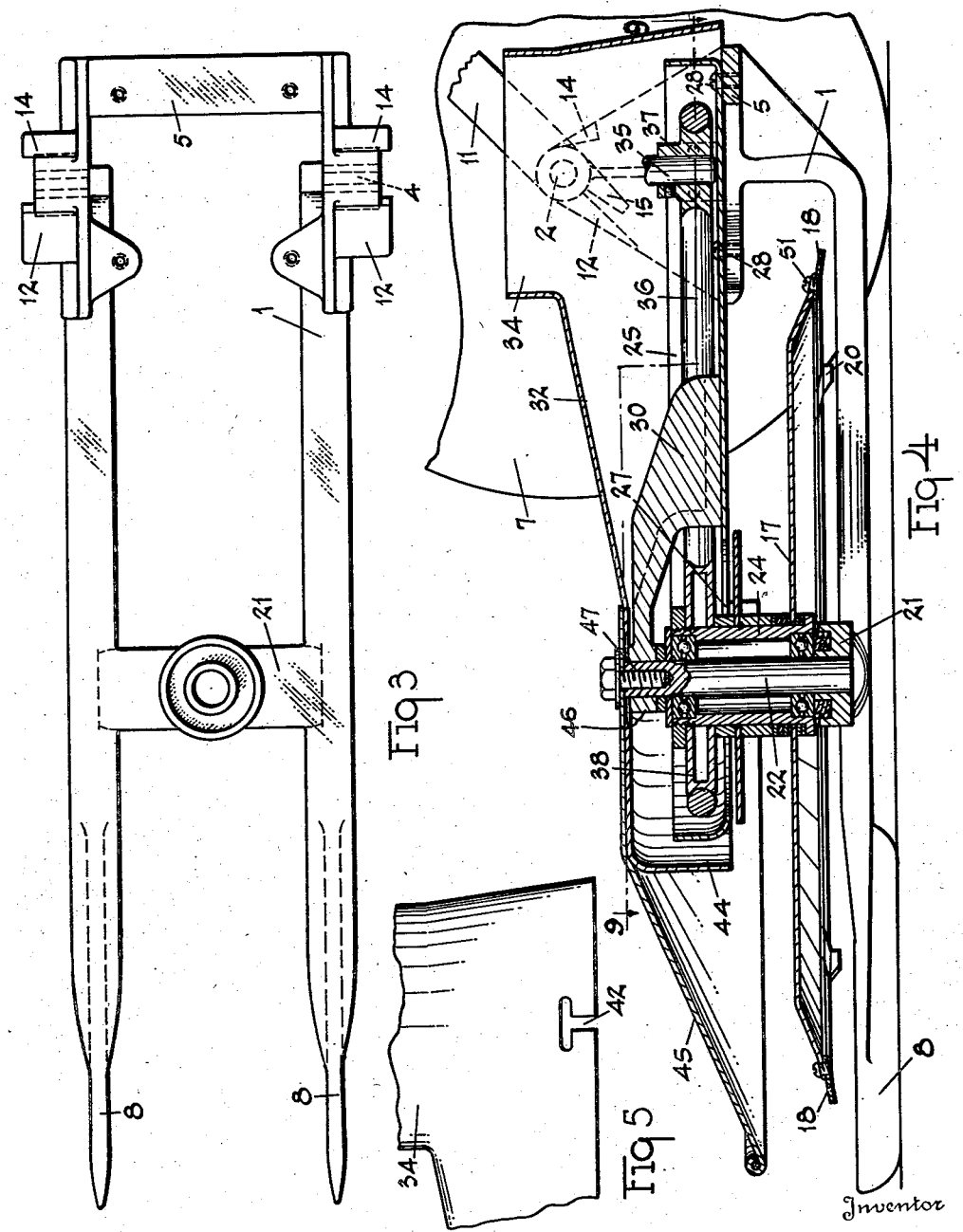

Inventor
Bertis H. Urschel
By [signature]
Attorney

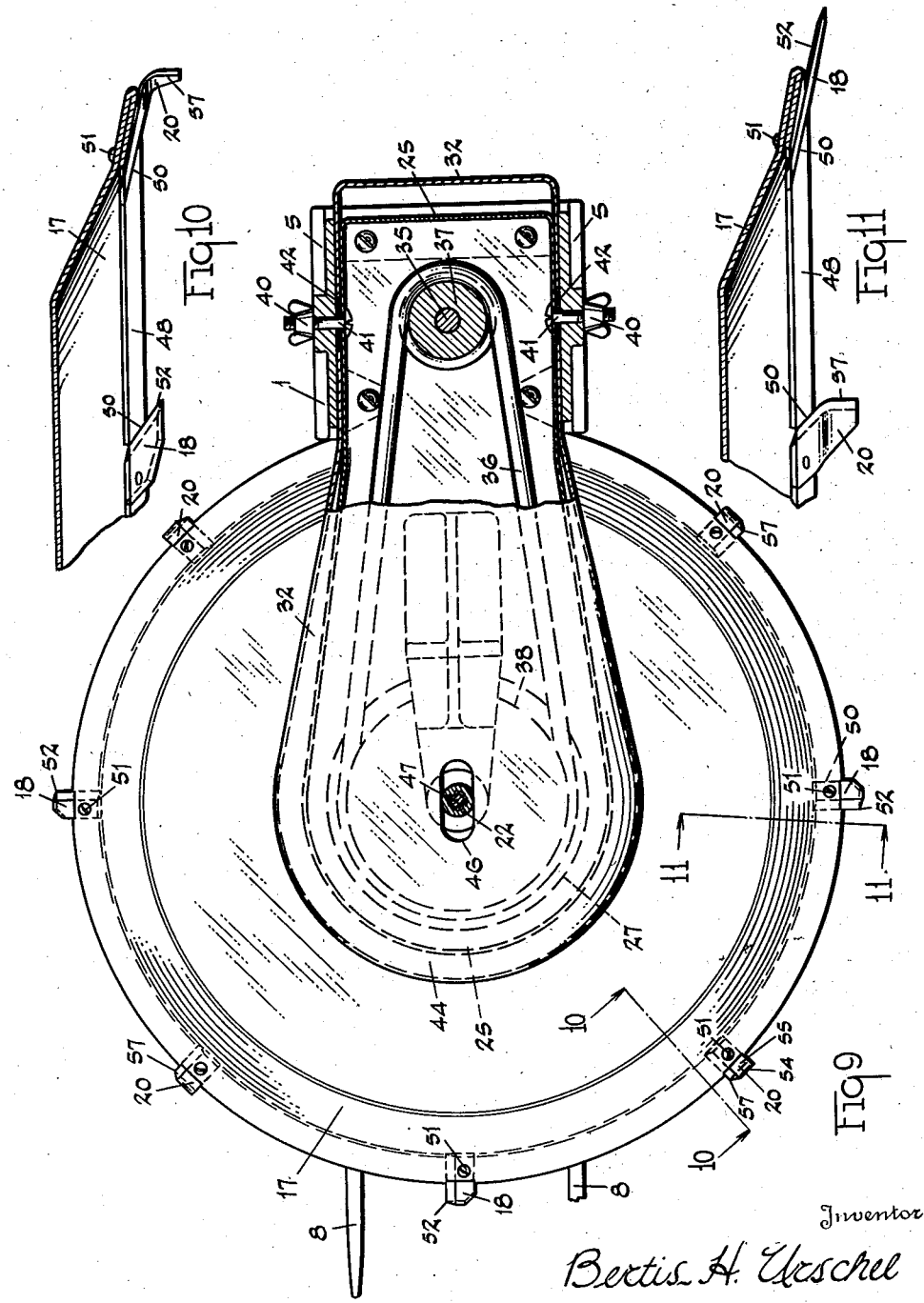

Patented Dec. 17, 1940

2,225,139

UNITED STATES PATENT OFFICE 2,225,139

MOWER

Bertis H. Urschel, Bowling Green, Ohio, assignor to The Urschel Engineering Company, Bowling Green, Ohio, a corporation of Ohio Application July 21, 1938, Serial No. 220,521

4 Claims. (Cl. 56—295)

My invention has for its object to provide an efficient, lightweight mower having parts that may be readily assembled and adjusted and may be made at a low cost of production.

The invention provides a plurality of cutting teeth that may be rotated at a relatively high speed upon movement of the mower over the ground, as by an electric motor, or by an internal combustion engine. The invention, also, provides cutting teeth whose cutting edges extend in lines inclined to a plane of rotation and the axis of rotation thereof, some of the cutting teeth having cutting edges more inclined to said plane of rotation and less inclined to said axis of rotation than others, whereby the cutting edges are moved through a plurality of kerfing planes to engage and cut sloping or bent blades of grass as the cutting teeth are rotated.

The invention also provides a protective means for preventing contact of the teeth with objects other than the grass.

The invention may be contained in mowers of different forms and to illustrate a practical application of the invention, I have selected, as an example, a mower embodying the invention and shall describe the selected mower hereinafter. The mower is illustrated in the accompanying drawings.

Figure 6:
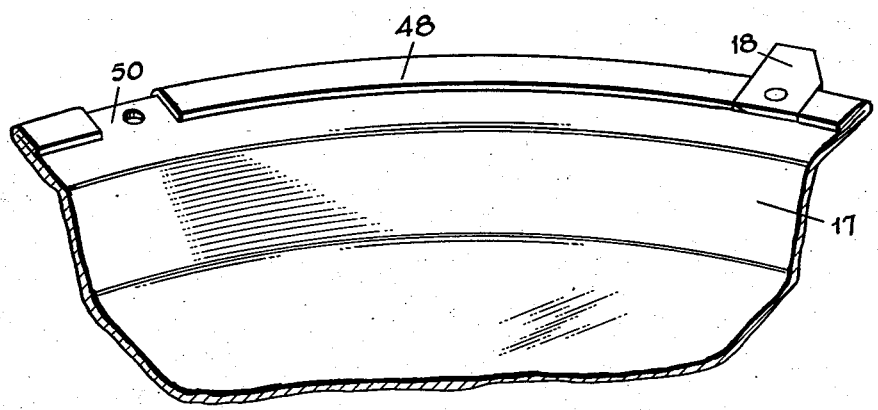
Figures 7, 8:
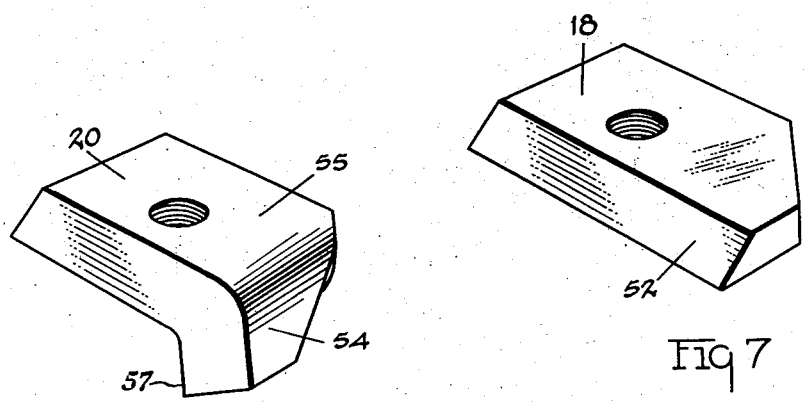

Fig. 1 is a perspective view of the mower. Fig. 2 is a perspective view of a part of the mower. Fig. 3 is a top view of the supporting frame. Fig. 4 is a view of a vertical section of the mower. Fig. 5 is a broken view of the cover part of the mower. Fig. 6 is a perspective view of a part of the inverted teeth-supporting disc. Fig. 7 illustrates a perspective view of certain of the teeth. Fig. 8 is a perspective view of other of the teeth. Fig. 9 illustrates a top elevational view of the mower, taken on the plane of the broken line 9—9, indicated in Fig. 4. Fig. 10 is a view of a section, taken on the plane of the line 10—10, indicated in Fig. 9. Fig. 11 is a view of a section, taken on the plane of the line 11—11, indicated in Fig. 9.

The mower is provided with a frame 1 to which the parts of the mower are connected or on which they are supported. The frame 1 is provided with a pair of stub axles 2 that are secured in openings 4 formed in heads 5 of the frame 1. The stub axles are secured by press-fitting the axles into the openings 4. A pair of wheels 7 are rotatably supported on the stub axles to rotatably support one end of the frame a short distance from the supporting surface of the wheels. The forward end of the frame terminates in a pair of runners or skids 8 and a handlebar 10 is connected by means of a yoke 11 to the stub axles 2 for guiding the movement of the mower over the lawn. Preferably, the frame 1 is provided with a pair of stops 12 and 14 located on opposite sides of projections 15 formed on the ends of the yoke 11. The projections 15 engage the stops 12 to tilt the frame 1 on the axis of the stub axles 2 and when the handlebar 10 is raised angularly sufficient to move it through the vertical, the stops 14 are engaged by the projection 15 to support the handle upright. Thus, the mower may be not only guided by the handle, but also the runners or skids 8 may be lifted above objects that may be in the path of the mower.

A disc 17 is rotatably supported on the frame 1 and is provided with a plurality of teeth 18 and 20 that are secured in marginal parts of the disc. The frame 1 is provided with an integrally formed cross part 21 and a bearing member 22 is secured to the cross part 21. The cross part 21 may be provided with a hole, into which the bearing member 22 may be secured by press-fitting. A ball bearing sleeve 24 is supported on the bearing member 22 and is connected to the disc 17. A shell 25, having an opening 27, is mounted on the head 5 by means of screws 28. A brace member 30 is welded to the bottom of the shell 25. One end of the brace member has an opening for receiving the end of the bearing member 22 when the shell 25 is assembled onto the frame.

An electric motor 31, if desired, may be mounted on the frame 1 by means of an adjustable cover part 32. The cover part 32 has a flange 34 that surrounds and fits one end of the motor shell and locates the axis of the shaft of the motor vertically. The inner end of the motor and the shaft extend between the inner ends of the stub axles. A grooved pulley wheel 37 is mounted on the lower end of the shaft 35 and a similar pulley wheel 38 is mounted on the sleeve 24, whereby the disc 17 is rotated by the operation of the motor. The relative sizes of the grooved wheels may be varied according to the character and rate of rotation of the motor means.

The cover 32 rests upon the end of the bracket 30 and is secured to the frame 1 by means of winged nuts 40 and bolts 41, (Fig. 2), that extend through the head 5, and T-slots 42 (Fig. 5) formed in the lower edge of the cover part 32 that is disposed intermediate the shell 25 and the heads 5. The cover part 32 has a depending flange part 44 that surrounds the shell 25. The cover part 32 protrudes short distances beyond the ends of the shell 25 to provide for adjustment of the cover part of the motor and, particularly, the distance between the wheels 37 and 38 to vary the tension of the belt 36. Adjustment of the cover part 32 relative to the shell 25, is provided by the T-slots 42, which permits longitudinal movement of the cover part 32 relative to the bolts 41.

An apron 45 extends from the top of the cover part 32 and slopes toward the disc 17. The edge part of the apron 45 overhangs the edge of the disc 17 to protect the teeth 18 and 20 and prevent, to a considerable degree, contact of the teeth and the edge of the disc with objects other than the grass. Preferably, the forward edge part of the apron 45 is located above end parts of the runners or skids 8 and and the skids 8 extend slightly beyond the forward edge part of the apron 45. The apron 45 is secured by a machine screw 47 located in the end of the spindle or bearing member 22 and extending through a slot 46 in the cover part 32. When the apron 45 is secured by the screw 47, the screw operates also to clamp the cover part 32 and the apron 45 to the bearing member 22. The adjustment of the tension of the belt may be produced by loosening the screw 47, to remove the cover part 32, and loosening the winged nuts 40 and again tightening the winged nuts and the screw 47 to secure the cover part 32 in position and the motor shaft in its adjusted relation with respect to the bearing member 22.

The disc 17 is formed somewhat dished, it being concave on the lower side to dispose the marginal portion in a position that is inclined downwardly and outwardly. The outer edge of the disc 17 is slotted and the parts 48, located intermediate the slots, are folded downwardly and inwardly to form, with the body portion of the disc, the slots 50, as shown in Fig. 6. The teeth have a width substantially the same as the slots 50 and are secured in the slots 50 by suitable screws 51. The teeth have lateral cutting edges 52. The teeth 20 are formed to have downwardly extending portions 54 that are inclined to the body portions 55 of the teeth 20, and when mounted in the disc and the disc is mounted on the bearing part 22, the portions 54 extend substantially vertical providing, thereby, the cutting edges 57 to cut depressed grass or grass inclined to the surface of the ground. Preferably, the alternate teeth are formed like the teeth 20 and the intermediates are formed like the teeth 18. If desired, the cutting edges may be located in planes extending radially from the axis of the rotation of the shaft.

I claim:

1. In a mower, a rotatably supported disc; a plurality of cutting teeth; means for supporting certain of the cutting teeth on the disc in spaced relation about the axis of rotation of the disc and proximate to the disc periphery; each of said certain cutting teeth having a cutting edge extending along a line inclined to a plane of disc rotation and to the axis of rotation of said disc so that, when the disc is rotated, the cutting edges of said certain teeth move through a common kerfing plane; means for supporting other of the cutting teeth on the disc in alternate relation with each of said certain teeth about the axis of rotation of the disc and proximate to the disc periphery; each of said other cutting teeth having a cutting edge extending along a line more inclined to the plane of disc rotation and less inclined to the axis of rotation of said disc than the line of inclination of each of said certain cutting teeth so that, when the disc is rotated, the cutting edges of said other cutting teeth are moved through a common kerfing plane extending in an inclined relation to the kerfing plane of said certain teeth.

2. In a mower, a rotatably supported disc; a plurality of cutting teeth; means for supporting the cutting teeth on the disc in spaced relation about the axis of rotation of the cutting disc and proximate to the disc periphery; certain of the cutting teeth having cutting edges extending in lines inclined to a plane of rotation of said disc and to the axis of rotation of said disc; and other of the cutting teeth having cutting edges extending in lines more inclined to the axis of rotation of said disc and less inclined to the plane of rotation of said disc than the inclination of the cutting edges of the said certain teeth, whereby the cutting edges of the plurality of teeth are moved through a plurality of kerfing planes as the disc is rotated.

3. In a mower, a rotatably supported disc; a plurality of cutting teeth, each of the cutting teeth having a cutting edge; means for supporting the cutting teeth proximate to the periphery of the disc to locate the cutting edges of the teeth so as to extend along lines each having various degrees of inclination to a plane of and axis of rotation of said disc, whereby the cutting edges are moved through a plurality of kerfing planes as the disc is rotated.

4. In a lawn mower, a rotatably, horizontally disposed disc having an inturned, slotted, marginal part; cutting teeth located in the marginal part; certain of the teeth each having a cutting edge located in a plane substantially at right angles to the axis of rotation of the disc and extending outwardly from said axis of rotation of the disc; other of the teeth each having a portion of their cutting edge located in a plane substantially at right angles to the axis of rotation of the disc and extending outward therefrom and another portion of the cutting edge extending substantially parallel to the axis of rotation of the disc and inclined to the first-named portion of said cutting edge, whereby the cutting edges of the teeth and their portions are moved through a plurality of kerfing planes as the disc is rotated.

BERTIS H. URSCHEL.